(12) United States Patent
Pierson

(10) Patent No.: US 7,091,706 B2
(45) Date of Patent: Aug. 15, 2006

(54) VOLTAGE REGULATOR AND METHOD OF REGULATING VOLTAGE

(75) Inventor: Martin Pierson, Howell, MI (US)

(73) Assignee: Lionel L.L.C., Chesterfield, MI (US)

( * ) Notice: Subject to any disclaimer, the term of this patent is extended or adjusted under 35 U.S.C. 154(b) by 34 days.

(21) Appl. No.: 10/822,307

(22) Filed: Apr. 12, 2004

(65) Prior Publication Data

US 2005/0151519 A1    Jul. 14, 2005

Related U.S. Application Data

(60) Provisional application No. 60/535,887, filed on Jan. 12, 2004.

(51) Int. Cl.
*G05F 1/40* (2006.01)
(52) U.S. Cl. .................. 323/237; 323/319
(58) Field of Classification Search ........ 323/237–241, 323/320–324, 267, 272, 283, 299; 307/125
See application file for complete search history.

(56) References Cited

U.S. PATENT DOCUMENTS

| 5,365,157 | A | * | 11/1994 | Geller et al. ........... 323/237 |
| 5,856,740 | A | * | 1/1999 | Rau et al. ............. 323/233 |
| 6,281,606 | B1 | * | 8/2001 | Westlake .............. 307/125 |

* cited by examiner

*Primary Examiner*—Rajnikant B. Patel
(74) *Attorney, Agent, or Firm*—O'Melveny & Myers LLP

(57) ABSTRACT

A voltage regulator includes a load control unit having an output configured to be coupled to a load. The load control unit is configured to be responsive to a load control signal for controlling the delivery of power to the load. A voltage regulator further includes a feedback unit coupled to the output of the load control unit. The feedback unit is configured to produce a feedback signal indicative of a voltage level applied to the load at the load control unit output. A voltage regulator still further includes a controller responsive to the feedback signal that is configured to generate the load control signal such that the voltage applied to the load substantially corresponds to a predetermined reference voltage level.

8 Claims, 3 Drawing Sheets

VOLTAGE REGULATOR AND METHOD OF REGULATING VOLTAGE

CROSS REFERENCE TO RELATED APPLICATIONS

This application claims the benefit of U.S. Provisional Patent Application No. 60/535,887 filed Jan. 12, 2004, which is hereby incorporated by reference in its entirety.

FIELD OF THE INVENTION

The present invention relates generally to model toy railroad layouts. More particularly, the present invention relates to a voltage regulator for model toy railroad layouts and a method for regulating the voltage supplied to a load of a model toy railroad layout.

BACKGROUND OF THE INVENTION

Model toy railroads have been in existence for many years. In a typical model toy railroad layout, the model train engine is an electrical engine that receives power from a voltage that is applied to the tracks and picked up by the train motor. A transformer is used to apply the power to the tracks while contacts on the bottom of the train, or metallic wheels of the train, pick up the applied power for the train motor. The transformer controls both the amplitude and polarity of the voltage, thereby controlling the speed and direction of the train. In HO systems, the voltage is a DC voltage. In O-gauge systems, for example, the track voltage is an AC voltage transformed by the transformer from the 60 Hz, 120 volt AC line voltage provided by a standard wall socket, to a reduced AC voltage (e.g., 0–18 volts AC).

Over the course of time, model toy railroad layouts have been developed so as to make their operation more closely resemble that of actual trains and railroad layouts. These developments have taken the form of providing model trains with various operating features and providing railroad layouts with a number of railroad accessories. For instance, many model trains are provided with lighting systems to allow for the illumination of headlights and other lighting features of a train in order to accurately capture a realistic depiction of an operating train. Many model trains are also equipped with smoke generating and sound generating devices that serve to produce smoke and sound to mimic the generation of smoke and sound of real trains. Similarly, railroad accessories, such as, for example, railroad crossings, lamp posts and illuminated buildings are also common in model toy railroads.

To utilize these operating features and accessories, however, power needs to be supplied to the respective devices. The power provided to these features and accessories typically comes from the line voltage provided to the system via the third or center rail of a railroad layout (i.e., O-gauge systems). One shortcoming that exists with conventional types of model toy railroad layouts is that the power provided to the features and accessory devices can fluctuate due to sudden changes in the track voltage (e.g., a surge of power or a dip in power that can be caused by track irregularities) or the sudden change in load resistance (e.g., the addition or removal of operating features and/or accessories). Consequently, these fluctuations can degrade the performance of the operating features or accessory devices, or alter, in an undesirable way, the operation of an operating feature or accessory. For instance, if the fluctuation is due to a spike in the track voltage, the fluctuations can be damaging to the load element of the operating features or accessory devices as too much power will be provided to the devices. Similarly, if the magnitude of these fluctuations is such that less than optimal power is provided to the operating features or accessories, the fluctuation can be detrimental to the overall objective of realism, as the operating features or accessories will not perform at their optimal level. Finally, fluctuation of the voltage may be undesirable when a uniform effect (e.g., lighting effect) is desired.

There is, therefore, a need for a model toy railroad layout that will minimize and/or eliminate at least one or more of the above-identified deficiencies.

SUMMARY OF THE INVENTION

A voltage regulator is presented. A voltage regulator in accordance with the present invention comprises a load control unit having an output configured to be coupled to a load. The load control unit is configured to be responsive to a load control signal for controlling the delivery of power to the load. The voltage regulator of the present invention further includes a feedback unit coupled to the output of the load control unit. This feedback unit is configured to produce a feedback signal indicative of a voltage level applied to the load at the output of the load control unit. The voltage regulator of the present invention still further includes a controller that is responsive to the feedback signal, and is configured to generate the load control signal such that the voltage level applied to the load substantially corresponds to a predetermined reference voltage level. The invention has the advantage of relatively simple construction and is responsive to both line and load fluctuations.

A method of regulating voltage is also presented.

These and other objects and features of this invention will become apparent to one skilled in the art from the following detailed description and accompanying drawings illustrating features of this invention by way of example.

DETAILED DESCRIPTION OF THE INVENTION

Figure 1:
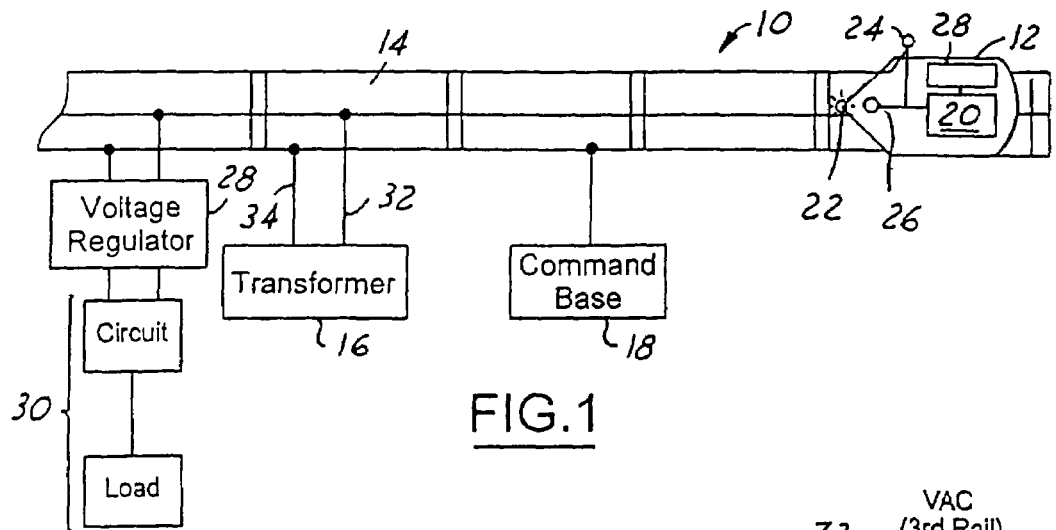
FIG. 1 is a simplified diagrammatic and block diagram view of a model toy railroad layout.

Referring now to the drawings wherein like reference numerals are used to identify identical components in the various views, FIG. 1 illustrates a model toy railroad layout 10. Railroad layout 10 includes at least one model train 12, a track 14 upon which train 12 travels, and a transformer 16. Railroad layout 10 may also include a command base 18, provided the model toy train is equipped with command control, which will be discussed below.

Train 12 includes electronics 20, which can be any electronics mounted upon model train 12. For example, electronics 20 may include electronics that control various operating features of the train, such as lights 22, a horn 24 and/or a smoke generating device 26, as shown in FIG. 1. In accordance with the present invention, electronics 20 may be powered by a power source regulated by a voltage regulator 28. The inventive voltage regulator 28, which will be discussed in greater detail below, ensures that the power provided to the aforementioned operating features of model train 12 is maintained at a constant level notwithstanding track voltage or load (impedance) fluctuations. The regulated voltage improves the functionality and performance of the operating features while at the same time minimizing the risk of overload, and therefore, potential damage to the power handling devices or load elements of the operating features. While voltage regulator 28 is described above in connection with operating features of a model train 12, it should be noted that voltage regulator 28 can be implemented in other applications. For instance, voltage regulator 28 may also be used in connection with control circuitry for other model toy railroad accessories 30, such as, for example, railroad crossings, lamp posts, illuminated buildings, other trackside accessories, or any other device associated with model toy railroad layouts whose operation will improve as the level of regulation of the power source increases.

With continued reference to FIG. 1, in an exemplary embodiment, transformer 16 is a power source for the model toy railroad layout 10. Transformer 16 supplies power to track 14 through connectors 32, 34, while command base 18 may be powered by a conventional wall outlet. Connector 32 connects the power terminal of transformer 16 to the center rail, or third rail of track 14, and connector 34 connects the ground or common terminal of transformer 16 to the outside rail of track 14. Transformer 16 can be a conventional AC or DC transformer, depending on the requirements of railroad layout 10, and in particular, model train 12. Additionally, transformer 16 may provide a fixed output, a variable output, or both. In one embodiment, railroad layout 10 is an O-gauge layout and transformer 16 is an AC transformer which transforms typical AC line voltage (e.g., 120 VAC) to a reduced level (e.g., 0–18 VAC for a conventional O-gauge variable output model train transformer) and supplies the same to track 14.

As described above, train 12 of model toy railroad layout 10 may be equipped to operate in accordance with a command control scheme to control the operation of, among other things, the operating features thereof. Of course, as already noted, train 12 may be configured for operation in accordance with a conventional control approach (i.e., variable track power level). The assignee of the present invention provides command control products under its TRAIN-MASTER trademark consistent with at least portions of U.S. Pat. Nos. 5,251,856, 5,441,224 and 5,749,547 issued to Young et al., each of which is hereby incorporated by reference in its entirety.

Figure 2:
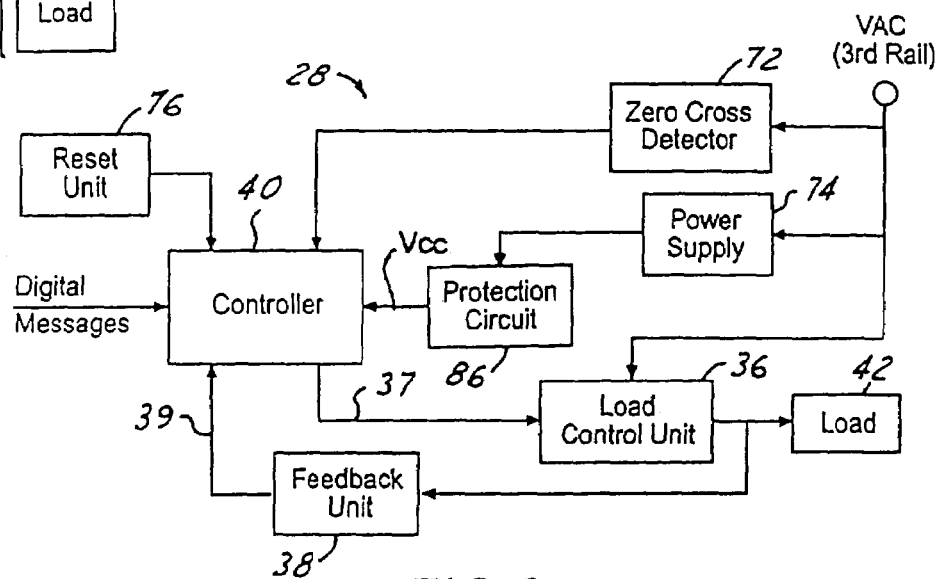
FIG. 2 is a schematic and block diagram view of a voltage regulator portion of the layout of FIG. 1 in accordance with the present invention.

With reference to FIG. 2, one embodiment of the inventive voltage regulator 28 is illustrated. As briefly described above, voltage regulator 28 is provided so as to allow for the control of the power provided to the operating features (e.g., lights, sound, smoke generating device, etc.) or other accessories (e.g., railroad crossings, lamp posts, etc.) that are associated with train 12 and railroad layout 10 at selected voltage levels. Regulator 28 regulates the output voltage provided thereby to a predetermined level, so as to provide regulated power to these features and accessories over a broad range of input track voltages and fluctuating load impedances, reducing the risk of overload and damage to the features and accessories. Voltage regulator 28 includes a load control unit 36, a feedback unit 38 and a controller 40.

Figure 3:
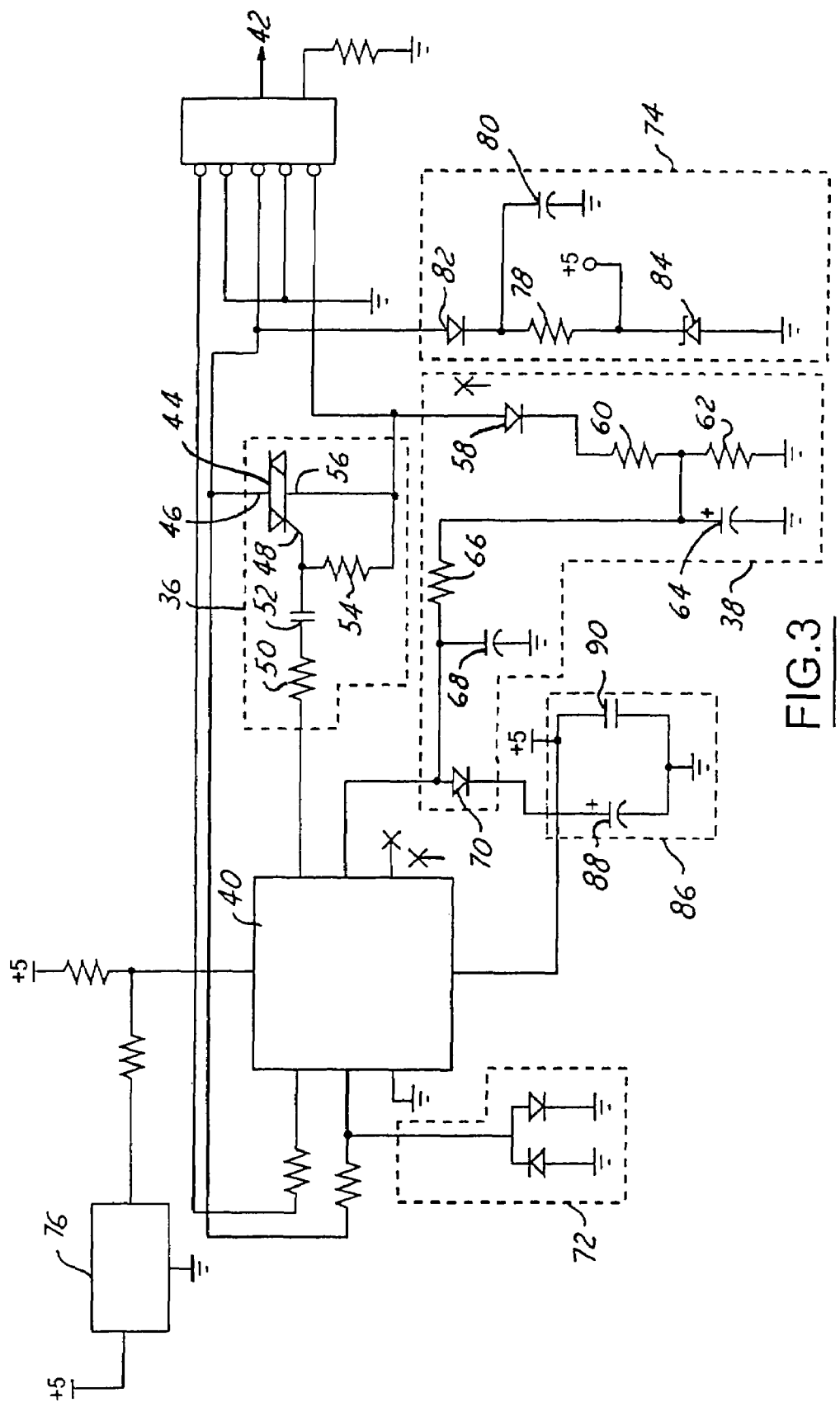
FIG. 3 is a schematic diagram showing, in greater detail, the voltage regulator of FIG. 2.

Load control unit 36 is responsive to a load control signal 37 for controlling the delivery of power to a load 42, described in greater detail below. Load control unit 36 is configured so as to have an input and an output. The input of load control unit 36 is connected to an output of controller 40, and the output of load control unit 36 is configured to be coupled to load 42. Load 42 may be any one or more of the aforementioned operating features of train 12 or model toy railroad accessories 30, or any other electrical load as that term is understood in the electrical arts, including any one or more of resistive, inductive, and/or capacitive components. With particular reference to FIG. 3, load control unit 36 may include a semiconductor based bi-directional switching device, such as a triac 44, which may be a commercially available component from ON Semiconductor, Phoenix, Ariz., under the Part No. T2322. It should be noted, however, that while in a preferred embodiment a triac device is used for the bi-directional switching device, this description is exemplary only and not limiting in nature. Other power switching devices exist that remain within the spirit and scope of this invention.

With reference ot FIG. 3, triac 44 has at least three terminals, as known. A first terminal 46 is connected to the system power source (e.g., the center or third rail). A second terminal 48, or gate terminal, is connected to the output of controller 40 by way of the series combination of a first resistor 50 and a first capacitor 52, which, in a constructed embodiment have values of 120Ω and 5600 pf, respectively. A second resistor 54 is connected between the second terminal and a third terminal 56 of triac 44. Resistor 54, in a constructed embodiment, has a value of 1 kΩ. Third terminal 56 of triac 44 is additionally connected to load 42, thereby defining the output of load control unit 36.

With continued reference to FIGS. 2–3, in addition to load 42, the output of load control unit 36 is also coupled to an input of feedback unit 38. Feedback unit 38 is configured to sample the voltage level provided to load 42 at the output of load control unit 36. Feedback unit 38 is further configured to produce a feedback signal 39 indicative of the sampled voltage level, and to then provide this feedback signal to the output terminal of feedback unit 38 to be transmitted to an input of controller 40. With particular reference to FIG. 3, feedback unit 38 includes a first diode 58 connected between load 42 and a third resistor 60, which, in a constructed embodiment, has a value of 560 kΩ. Resistor 60 is further connected in series to a first parallel combination comprising a fourth resistor 62, which, in a constructed embodiment has a value of 2 MΩ, and a second capacitor 64, which, in a constructed embodiment is a 6.3V 0.1 µf capacitor. This first parallel combination is yet further connected in series to a second parallel combination comprising a fifth resistor 66 and a third capacitor 68 (thereby forming an RC circuit), which is then connected to a second diode 70 and an input of controller 40, thereby defining the output of feedback unit 38. In a constructed embodiment, resistor 66 is a 2 MΩ resistor and capacitor 68 is a 6.3V 0.1 µf capacitor. The output of feedback unit 38 is coupled to an input of controller 40 to allow for the transmission of feedback signal 39 to controller 40. The arrangement of resistors and capacitors define a transfer function configured to cooperate with a PI control loop implemented in controller 40.

With continued reference to FIGS. 2–3, controller 40, which in a constructed embodiment is a microprocessor unit, is responsive to feedback signal 39 produced by feedback unit 38 to generate the load control signal 37 such that the voltage level provided substantially corresponds to a predetermined reference voltage level. It should be noted, however, that while controller 40 may be a microprocessor unit, the functionality of controller 40 can be performed by equivalent analog or digital circuitry. Controller 40 is configured to receive inputs and to generate outputs, and is further configured with a predetermined reference voltage. This predetermined reference voltage, in one embodiment, may be programmed into controller 40. However, in a preferred embodiment, a user may define the reference voltage level by manually inputting the desired reference voltage level into controller 40. The controller 40, of course, being provided with an interface configured to receive such predetermined, specific voltage level and to store the same.

Controller 40 receives feedback signal 39 produced by feedback unit 38 and then processes this signal with respect to the predetermined reference voltage level described above. In operation, the input into controller 40, and a comparator module in controller 40, in particular, is the voltage across the RC circuit formed by fifth resistor 66 and third capacitor 68. As the voltage across the RC circuit reaches the predetermined reference voltage level, an interrupt occurs in controller 40, thereby causing an interrupt handler to run a routine. In an exemplary embodiment, the interrupt handler has a counter that counts the period of time between when the voltage level across the RC circuit was zero volts, or reset, to when the RC voltage reaches the predetermined reference voltage level. The output of this counter is inversely proportional to the feedback voltage level across the RC circuit. Accordingly, a larger counter output represents a lower voltage and a lower counter output represents a higher voltage. Controller 40 then uses this counter output to determine the deviation between the output voltage and the predetermined reference voltage level, and to generate and/or alter load control signal 37 that is delivered to load control unit 36 such that the output voltage level provided to load 42 substantially corresponds to the predetermined reference voltage level. When the interrupt handler finishes its routine, the comparator input is changed to an output and is grounded. Third capacitor 68 of the RC circuit is discharged, the counter is reset, and then the comparator input is changed back to an input in order to repeat the functionality as needed. The load control signal 37, in a constructed embodiment, is generated by microprocessor 40 using a proportional-integral (PI) control strategy. Various PI control approaches are known in the art. Accordingly, the voltage supplied to load 42 is continuously sampled and processed under PI control in order to produce a load control signal 37 such that the output voltage level is at a constant, desired level.

With continued reference to FIGS. 2–3, voltage regulator 28 may further include a zero-cross detection unit 72, as known in the art, connected between controller 40 and the system power source (e.g., the center or third rail). Zero-cross detection unit 72 allows for both the phase-conduction angle control of triac 44, as well as the synchronization to TRAINMASTER communications that are input into controller 40. In particular, in the embodiment in which voltage regulator 28 is used in association with the operating features of the train 12, zero-cross detection unit 72 detects a zero-crossing point of the system power source from transformer 16 to track 14 flowing along the connection formed by the third rail and electrical contacts on train 12 which, in the United States, results in a 60 Hz timing reference signal. In the embodiment in which voltage regulator 28 is used in association with a railroad accessory, zero-cross detection unit 72 detects the zero-crossing point of the system power source from transformer 16 to track 14 flowing along the connection formed by the circuitry of a given railroad accessory and the third rail, which similarly results in a 60 Hz timing reference signal. The timing reference signal supplied by zero-crossing detection unit 72 is used by controller 40 to control triac 44 of load control unit 36. In operation, controller 40 calculates a phase-conduction angle for triac 44 based on feedback signal 39 and the predetermined reference (target) voltage. The phase-conduction angle is the total angle over which the flow of current to the load occurs through triac 44, delivering an average power from the system power source (i.e., center rail or third rail). Controller 40 can alter the phase-conduction angle of triac 44 and, accordingly, the resulting voltage level, by sending load control signal 37, which takes the form of a phase conduction angle signal, to second or gate terminal 48 of triac 44. This results in load control signal 37, and therefore load control unit 36, providing a limited and constant voltage at the output of triac 44.

Figure 4:
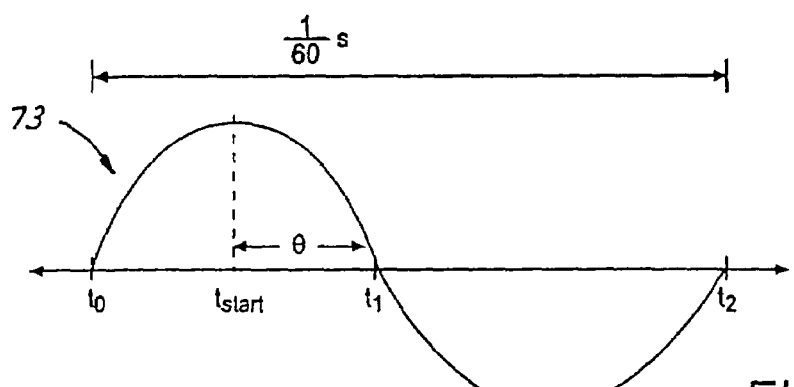
FIG. 4 is a waveform representing one cycle of the AC voltage applied to the track of a model toy railroad layout in accordance with the present invention.

It should be noted, however, that one characteristic of a triac or a SCR device is that while the turning "ON" of the device can be physically controlled, the turning "OFF" cannot. Consequently, once the device is triggered, it will remain in conduction until the current goes to zero. Therefore, the conduction angle, once calculated, must be implemented as follows. With reference to FIG. 4, a waveform 73 representing one cycle of the track voltage is shown. The start time of conduction designated as $t_{start}$, which corresponds to a conduction angle $\theta$, must be calculated. Since the frequency of the track voltage signal is known (i.e., 60 Hz), the time between each zero-crossing point of the voltage signal is also known (i.e., the time between, for example, $t_0$ and $t_1$). Accordingly, the start time of conduction can be calculated based on the time corresponding to conduction angle $\theta$ taken back from the zero-crossing point that occurs at $t_1$. Once this start time is calculated, a timer is appropriately set to this start time so that following a delay of a predetermined amount of time from, for example, $t_0$ to $t_{start}$, the triac will trigger and begin conduction of the appropriate level of power. This process essentially allows for the complete control of conduction since the conduction start time is set so as to trigger, and therefore maintain, conduction for a period of time ending at the next zero-crossing point when the current to the triac goes to zero. The same process is followed with respect to the conduction of the triac during the negative half of the cycle. Accordingly, by controlling the phase-conduction angle of triac 44, it is possible to limit the voltage output of load control unit 36 to a constant level required to operate load 42. It should be noted, however, that while a triac is used in the constructed embodiment of this invention, other power switching devices exist, such as MOSFET's, that can be used to carry out the same functionality. However, while these power switching devices, unlike triacs, have the benefit of being able to be both turned "ON" and turned "OFF", achieving bi-directionality is much more difficult. Accordingly, triacs and other like devices are better suited for this application. Nonetheless, these other power switching devices can be implemented to carry out the necessary functionality.

With reference to FIGS. 2–3, in one embodiment, voltage regulator 28 further includes a power supply 74 and a reset unit 76, wherein reset unit 76 is connected to controller 40. Power supply 74 is configured to generate a constant predetermined supply voltage, designated as $V_{cc}$ in the drawings. This supply voltage is used to power components of voltage regulator 28, such as controller 40. In a preferred embodiment, power supply 74 is a 5 volt power supply and includes a third parallel combination comprising a sixth resistor 78 and fourth capacitor 80 connected in between a third diode 82 that is, in turn, connected to both the system power source (e.g., third rail) and a zener diode 84, which is connected to ground. In a preferred embodiment, resistor 78 is a 1 kΩ resistor, capacitor 80 is a 35V 100 μf capacitor, and zener diode 84 is a 5.1V 1 W zener diode. Voltage regulator 28 may further include a protection circuit 86 connected between the output of power supply 74 and controller 40. Protection circuit 86 is comprised of a fifth capacitor 88 and a sixth capacitor 90 connected in parallel, wherein, in a preferred embodiment, capacitor 88 is a 6.3V 100 μf capacitor and capacitor 90 is a 0.01 μf capacitor.

Figure 5:
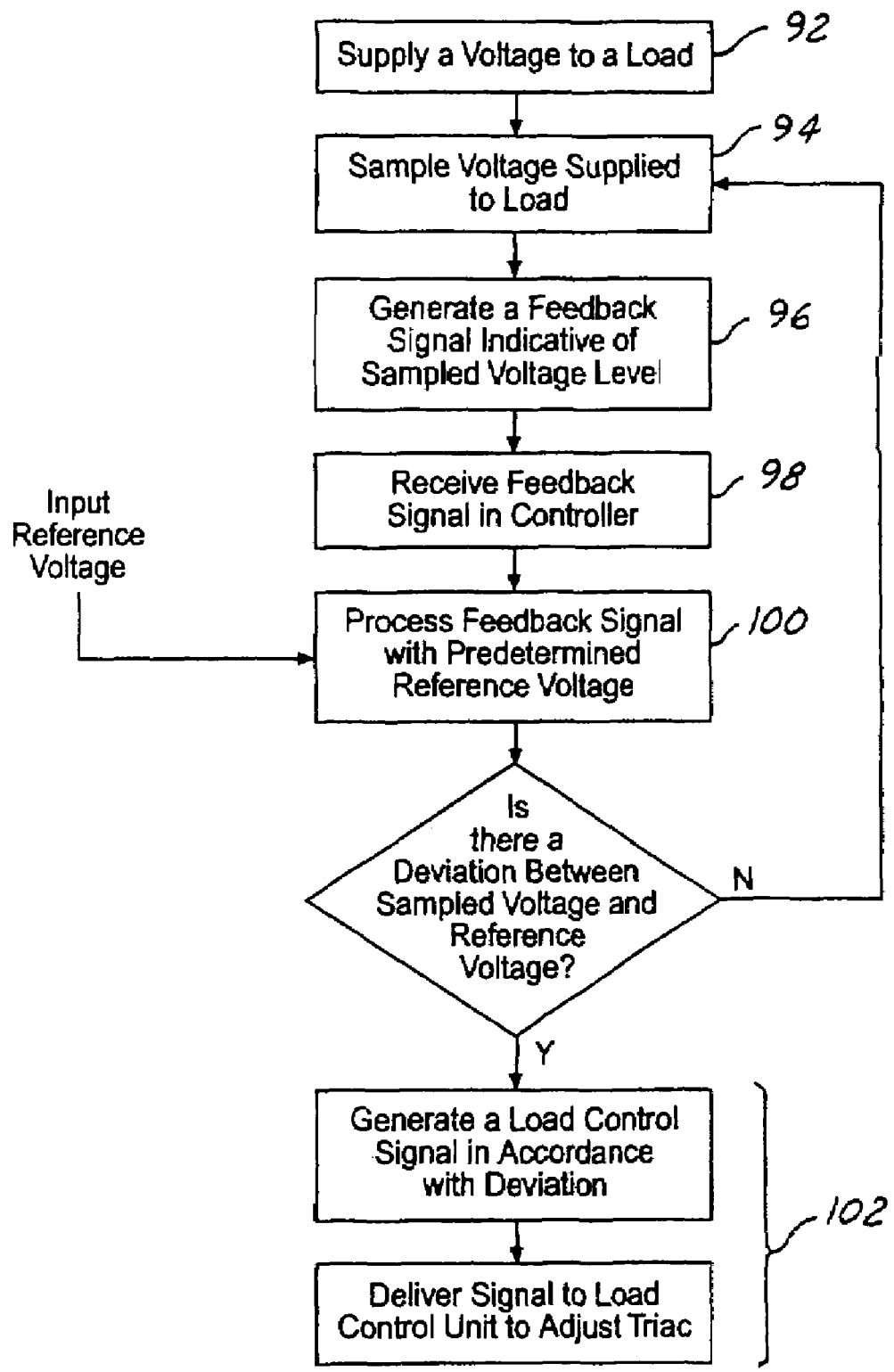
FIG. 5 is a flow chart diagram showing a method of regulating voltage in accordance with the present invention.

A method of regulating voltage is also presented. With reference to FIG. 5, in a first step 92, load control unit 36 provides a voltage to a load 42 (e.g., operating features or railroad accessories) of model train 12 or layout 10. In a further step 94, feedback unit 38 samples the voltage on the output of load control unit 36. In still a further step 96, feedback unit 38 generates a feedback signal 39 that is indicative of the sampled voltage level. In yet still a further step 98, controller 40 receives feedback signal 39 over the connection between the output of feedback unit 38 and the input of controller 40. In still a further step 100, controller 40 processes this sampled voltage level in conjunction with a predetermined reference voltage level. Controller 40 performs this function by performing the substep of comparing the two voltage levels in order to determine a deviation between the actual voltage provided to load 42 and the predetermined reference voltage. In a preferred embodiment, this predetermined reference voltage is manually inputted into controller 40 by a user, however, as set forth above, the predetermined reference voltage may also be programmed into controller 40 without any user involvement. Once controller 40 processes the sampled voltage level with the reference voltage level, in step 102 controller 40 controls the voltage provided to load 42 in accordance with the deviation in order to maintain the control voltage within a predetermined maximum. In a preferred embodiment, controller 40 carries out this functionality by generating a load control signal 37 in accordance with a proportional-integral (PI) control strategy. This PI control strategy is known in the art. Once controller 40 generates load control signal 37, it communicates generated signal 37 to load control unit 36 to adjust the phase-conduction angle of triac 44 in order to make any adjustments or alterations to the voltage being supplied to load 42.

Accordingly, in light of the above, the inventive voltage regulator 28 allows the model toy train system to be responsive sudden changes in line voltage (e.g., a surge or a dip in power) and/or to sudden changes in load resistance (e.g., the addition or removal of operation features and/or accessories). For example purposes only, a model train may have a headlight feature wherein it is desirable to maintain a constant level of brightness when the headlight is illuminated. Accordingly, the control circuitry used to control the "ON/OFF" state and operation of the headlight is connected to the inventive voltage regulator to ensure that the headlight receives a constant voltage so that the headlight will maintain its brightness regardless of the variance of track voltage or the addition and/or removal of other accessories or loads from the system. Similarly, a model toy layout may include a lighting system comprised of a number of lamp posts disposed throughout the layout. It is desirable to maintain a constant level of brightness when these lamp posts are illuminated. Accordingly, the control circuitry used to control the operation of these lamps is connected to the inventive voltage regulator so as to maintain a constant voltage being provided to the lamps, thereby achieving a constant level of brightness, regardless of variances in track voltage or system load.

It should be noted that while only those embodiments set forth above have been described in detail, other configurations and embodiments for the present invention exist that are within the spirit and scope of the invention.

What is claimed is:

1. A power control system for a model train traveling on a track, comprising:
   a transformer operatively coupled to the track to supply an operating voltage thereto;
   at least one accessory associated with at least one of the model train and the track; and
   a voltage regulator operatively coupled to the at least one accessory to supply a regulated voltage thereto derived from the operating voltage, the voltage regulator comprising:
   a load control unit having an output coupled to the accessory, the load control unit being responsive to a load control signal for controlling delivery of the regulated voltage to the accessory;
   a feedback unit coupled to the output of the load control unit and adapted to provide a feedback signal indicative of the regulated voltage at the output; and
   a controller responsive to said feedback signal and adapted to generate the load control signal such that the regulated voltage substantially corresponds to a reference voltage level, the controller being further responsive to a user command to define the reference voltage level.

2. The power control system of claim 1, wherein the controller is adapted to determine deviation between the regulated voltage and the reference voltage level.

3. The power control system of claim 1, wherein the user command comprises a digital message.

4. The power control system of claim 1, wherein the voltage regulator further comprises a reset unit operatively connected to the controller.

5. The power control system of claim 1, wherein the load control unit includes at least one bi-directional switching device.

6. The power control system of claim 5, wherein the switching device is a triac.

7. The power control system of claim 6, wherein the power regulator further comprises a zero-cross detection unit adapted to detect a zero crossing of the operating voltage and enable the controller to derive a corresponding phase-conduction angle of the triac therefrom.

8. The power control system of claim 1, wherein the controller is adapted to generate the load control signal in accordance with a proportional-integral (PI) transfer function.

* * * * *